United States Patent
Matthews et al.

(10) Patent No.: US 7,127,182 B2
(45) Date of Patent: Oct. 24, 2006

(54) EFFICIENT OPTICAL TRANSMISSION SYSTEM

(75) Inventors: Paul J. Matthews, Ellicott City, MD (US); Paul D. Biernacki, Fairfax, VA (US); Sandeep T. Vohra, Ellicott City, MD (US)

(73) Assignee: Broadband Royalty Corp., Wilmington, DE (US)

( * ) Notice: Subject to any disclaimer, the term of this patent is extended or adjusted under 35 U.S.C. 154(b) by 600 days.

(21) Appl. No.: 10/270,726

(22) Filed: Oct. 16, 2002

(65) Prior Publication Data
US 2003/0076567 A1 Apr. 24, 2003

Related U.S. Application Data

(60) Provisional application No. 60/329,516, filed on Oct. 17, 2001.

(51) Int. Cl.
*H04B 10/04* (2006.01)

(52) U.S. Cl. ............. 398/183; 398/182; 398/185; 398/186; 398/187; 398/188; 398/189; 398/190; 398/191; 398/192; 398/193; 398/194; 398/200; 398/140; 398/141; 398/147; 398/158; 398/159; 398/202; 398/25; 398/30; 398/31; 398/32; 370/204; 385/2; 342/367

(58) Field of Classification Search ........... 398/154, 398/182, 183, 185, 186, 187, 188, 189, 190, 398/191, 192, 200, 193, 194, 140, 141, 158, 398/147, 159, 25, 30, 31, 32, 202; 370/204; 385/2; 342/367
See application file for complete search history.

(56) References Cited

U.S. PATENT DOCUMENTS

| | | | |
|---|---|---|---|
| 5,166,821 A | 11/1992 | Huber | |
| 5,359,450 A | 10/1994 | Ramachandran et al. | |
| 5,400,417 A * | 3/1995 | Allie et al. ..................... | 385/2 |
| 5,420,868 A | 5/1995 | Chraplyvy et al. | |
| 5,477,368 A | 12/1995 | Eskildsen et al. | |
| 5,515,196 A | 5/1996 | Kitajima et al. | |
| 5,548,436 A | 8/1996 | Ramachandran et al. | |
| 5,671,075 A | 9/1997 | Ramachandran et al. | |
| 4,560,246 A | 6/1998 | Cotter | |
| 5,828,477 A | 10/1998 | Nilsson et al. | |
| 5,930,024 A | 7/1999 | Atlas | |
| 6,166,837 A | 12/2000 | Adams et al. | |
| 6,252,693 B1 | 6/2001 | Blauvelt | |
| 6,282,003 B1 | 8/2001 | Logan, Jr. et al. | |
| 6,396,801 B1 * | 5/2002 | Upton et al. ................. | 370/204 |
| 6,686,879 B1 * | 2/2004 | Shattil ......................... | 342/367 |
| 6,876,818 B1 * | 4/2005 | Bai et al. ..................... | 398/154 |

OTHER PUBLICATIONS

Hirose et al., suppression of Stimulated Brillouin Scattering and Brillouin Crosstalk by Frenquency-Sweeping Spread-Spectrum Scheme, Journal of Optical Communications, 12 (1991) 3, pp. 82-85. (in English).

* cited by examiner

*Primary Examiner*—Hanh Phan
(74) *Attorney, Agent, or Firm*—FSP LLC

(57) ABSTRACT

A transmitter for optical communication systems includes a source of optical radiation, a source of complex non-information signals, and a modulator unit in communication with the source of optical radiation. The modulator unit is also in communication with the source of complex non-information signals. The modulator has an input adapted to receive information-bearing signals.

50 Claims, 9 Drawing Sheets

EFFICIENT OPTICAL TRANSMISSION SYSTEM

This Application is based on Provisional Application No. 60/329,516 filed Oct. 17, 2001, the entire contents of which is hereby incorporated by reference.

BACKGROUND

1. Field of Invention

This invention relates to optical transmission systems, and more particularly to optical transmission systems having reduced Brillouin scattering.

2. Discussion of Related Art

Demand for optical communication systems is growing with the growing demand for faster broadband and more reliable networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical Communications can be found in "Optical Communication Systems" by Gowar, ed. Prentice Hall, NY, 1993.

WDM optical communication systems carry multiple optical signal channels, each channel being assigned a different wavelength. Optical signal channels are generated, multiplexed to form an optical signal comprised of the individual optical signal channels, and transmitted over a single waveguide such as an optical fiber. The optical signal is subsequently demultiplexed such that each channel corresponding to a wavelength is individually routed to a designated receiver.

In wavelength division multiplexing, the transmitted wavelengths are locked to one of the International Telephone Union (ITU) standard wavelengths, called the ITU grid, to meet cross-talk specification and reliability in operation over time. Technologies such as Distributed Feedback Lasers (DFB) are used to provide a source at a desired wavelength for the ITU grid.

In optical transmission systems it is desirable to transmit signals, at wavelength channels, via optical waveguides (optical fibers) at high power to maintain sufficient signal to noise ratios. This is particularly desired when transmitting the signals over extended distances so as to reduce the bit error rate in the received optical signal. Optical fibers, however, comprise a medium that exhibits nonlinear behavior at high power levels which results in detrimental performance of the transmission systems.

Stimulated Brillouin Scattering (SBS) within a core of an optical fiber results from photons being scattered by localized refractive index variations (acoustic grating) induced by acoustic (i.e., sound) waves or acoustic phonons. These refractive index variations are caused by acoustic vibrations in the silica lattice that makes up the core of the fiber. Due to the dependence of the refractive index on light intensity in the nonlinear regime, the high intensity light in the fiber will induce lattice vibrations which results in creation of acoustic waves that scatter more light. The optimum power level at which optical signals can be transmitted is typically the maximum power level at which degradation of the signal due to nonlinear effects is avoided. That is the threshold power at which stimulated Brillouin scattering Occurs (SBS Threshold).

When the threshold light power is exceeded (as low as 5 mW per channel depending on the quality of the optical fiber, length of fiber, and other components in the communication system), light from an intense forward propagating signal, for example light from a laser launched into an optical fiber, can interact nonlinearly with the lattice of the core material of the optical fiber to generate vibrations or acoustic phonons which in turn promote the appearance of Stimulated Brillouin Scattering (SBS) which takes the form of a backward propagating signal also known as a Stokes signal. The stokes signal is responsible for degrading the forward propagating signal thus degrading system performance as well as potentially damaging transmitter components.

One way of avoiding this problem is to limit the power of the transmitted signal (forward propagating). However, a reduction in the forward propagating signal reduces the allowable un-repeatered span length in fiber transmission systems, as well as the number of splits which can be used in a fiber distribution system such as a CATV system.

Another way of alleviating this problem is to increase the power at which the onset of SBS occurs, that is increase the SBS threshold. This threshold is defined as the level of forward optical power at which the power of the backward Stokes signal becomes equal to the power of the Rayleigh scattered signal.

Therefore, it is desirable to overcome these and other limitations thus allowing overall improved performance and/or reduced cost of the transmission network.

SUMMARY

One aspect of the present invention is to provide a transmitter for optical communication systems, comprising a source of optical radiation, a source of complex non-information signals, and a modulator unit in communication with the source of optical radiation. The modulator unit is also in communication with the source of complex non-information signals. The modulator has an input adapted to receive information-bearing signals. The source can be, for example, a laser.

In one embodiment, the information-bearing signals have a first spectral distribution, and the source of complex non-information signals provides a complex non-information signal. The complex non-information signal has a second spectral distribution that is substantially non-overlapping with the first spectral distribution.

In one embodiment, the source of complex non-information signals is constructed to provide a pseudo-random signal. In another embodiment, the source of complex non-information signals is constructed to provide a spread spectrum signal. In yet another embodiment, the source of complex non-information signals is constructed to provide a chaotic signal.

In one embodiment, the modulator unit of the transmitter comprises a direct modulator and an external modulator. In another embodiment, the external modulator is in communication with the input adapted to receive information-bearing signals. In a further embodiment, the source of complex non-information signals is in communication with the direct modulator.

In one embodiment, the modulator unit includes an upconverter in communication with the source of complex non-information signals and the direct modulator. In another embodiment the modulator unit further includes an upconverter in communication with the source of complex non-information signals and the external modulator.

In another embodiment, the modulator unit comprises an external modulator in communication with at least one of the source of complex non-information signals and the input adapted to receive information-bearing signals. In one embodiment, the modulator unit includes an external modulator in communication with the source of complex non-information signals and the input adapted to receive information-bearing signals.

In an embodiment the modulator unit includes an upconverter in communication with the complex non-information signals and the external modulator.

In another embodiment the modulator unit further includes a second modulator in communication with the input adapted to receive information-bearing signals. In an embodiment the external modulator is a Mach-Zehnder interferometer.

Another aspect of the present invention is to provide a method of transmitting information in an optical communication system. The method comprises generating a beam of light, modulating the beam of light responsive to complex non-information signals, and modulating the beam of light responsive to information signals. The complex non-information signals have a first signal spectrum and the information signals have a second signal spectrum. The first and second signal spectra are substantially non-overlapping in a frequency domain.

In one embodiment, the modulating of the beam of light responsive to complex non-information signals is performed by direct modulation. In another embodiment, the modulating of the beam of light responsive to complex non-information signals is performed by external modulation.

BRIEF DESCRIPTION OF THE DRAWINGS

These and other objects and advantages of the invention will become more apparent and more readily appreciated from the following detailed description of the presently preferred exemplary embodiments of the invention, taken in conjunction with the accompanying drawings, of which.

DETAILED DESCRIPTION

In the following description, in order to facilitate a thorough understanding of the invention and for purposes of explanation and not limitation, specific details are set forth such as particular optical and electrical circuits, circuit components, techniques, etc. However, the invention may be practiced in other embodiments that depart from these specific details. The terms optical and light are used in a broad sense in this description to include both visible and non-visible regions of the electromagnetic spectrum. Currently, infrared light is used extensively in transmitting signals in optical communication systems. Infrared light is included within the broad meaning of the term light as used herein. The terms "data" and "information-bearing signals" are meant to broadly cover any type of information that one may transmit by an optical communication system including, but not limited to, cable TV, music, video, internet, and telephone. Conversely, "non-information" signals refer to signals that do not carry information that users intend to transmit and receive through the optical communication system.

In a digital transmission system, signals which are constituted of a series of ones and zeros are sent from a transmitter to a receiver. High coherent radiation sources, such as lasers, when launched into an optical fiber stimulate Brillouin scattering, thus leading to depletion of power in the forward direction and an increased amount of backscattered power in the backward direction. The reduction of power in the forward direction has an adverse impact on the required signal-to-noise ratio at the receiver. Moreover, the backscattered power can lead to resonant effects that may degrade system performance as well as potentially damage transmitter components.

The transmission system or transmitter of the present invention allows one to alleviate the above limitations and allows efficient propagation of optical signals over long distances without suffering from the impairments due to Brilloum scattering.

Figure 1:
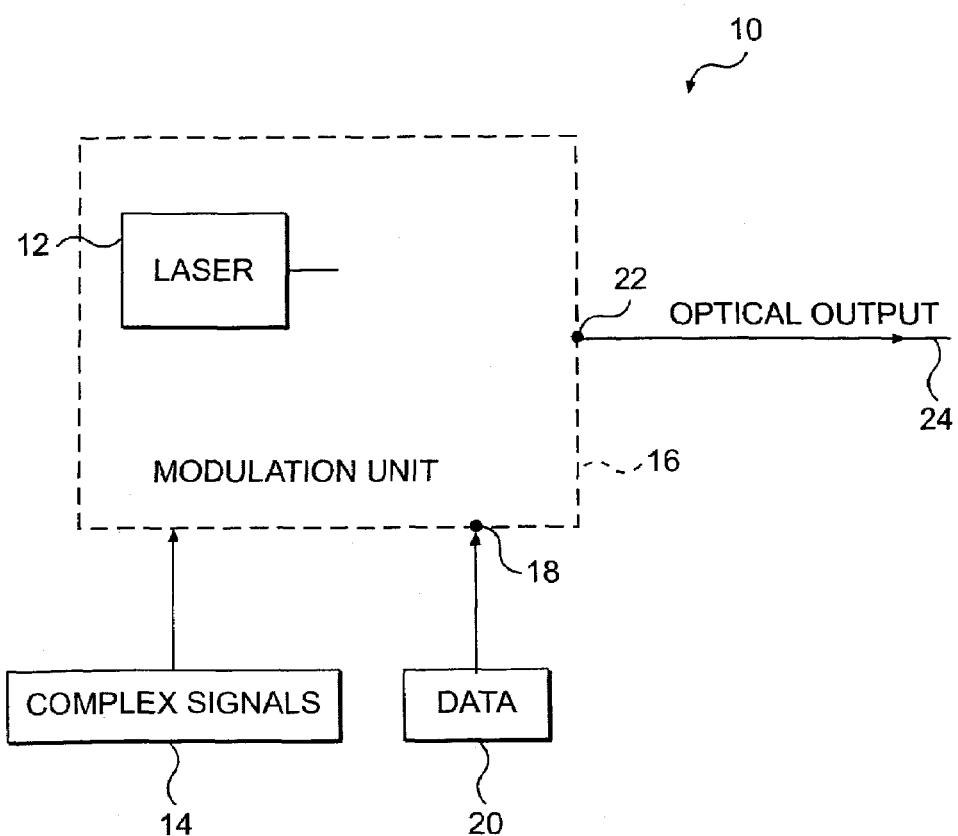
FIG. 1 is a schematic representation of an optical transmitter according to one embodiment of the present invention.

FIG. 1 shows transmitter 10 for optical communication systems according to an embodiment of the present invention. The transmitter 10 comprises a source of optical radiation 12, a source of complex non-information signals 14 and a modulator unit 16. The modulator unit 16 is in communication with the source of optical radiation 12 and is also in communication with the source of complex non-information signals 14. The modulation unit 16 further comprises an input 18 adapted to receive information-bearing signals (data signals) 20. The source of complex non-information signals 14 is constructed to provide at least one type of various complex signals, for example, a pseudo-random signal, a spread spectrum signal, and/or a chaotic signal.

The information-bearing signals (data signals) 20 have a first spectral distribution. The complex non-information signals generated by complex non-information source 14 have a second spectral distribution. The first and second spectral distributions are substantially non-overlapping. This allows broadening of the frequency bandwidth of the optical signal output 22 before launching the optical into the optical transport medium 24, such as, an optical fiber.

Figure 2A:
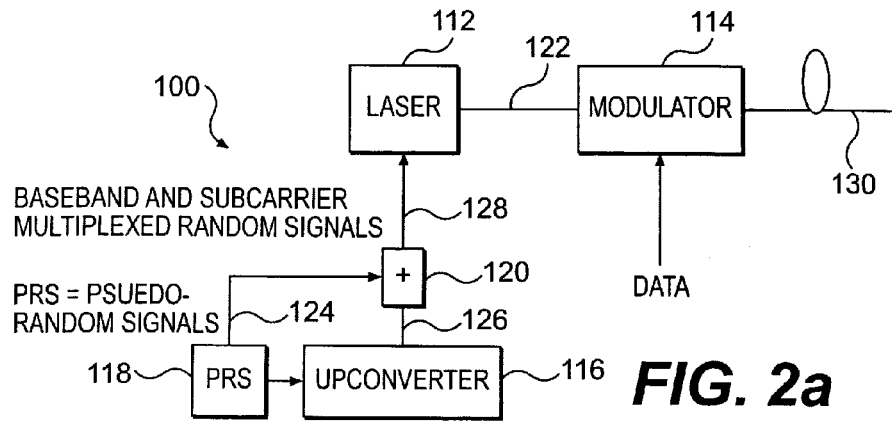
FIG. 2a is a schematic illustration of an embodiment of the invention that provides direct baseband and subcarrier modulation of an optical carrier by pseudo-random signals.
Figure 2B:
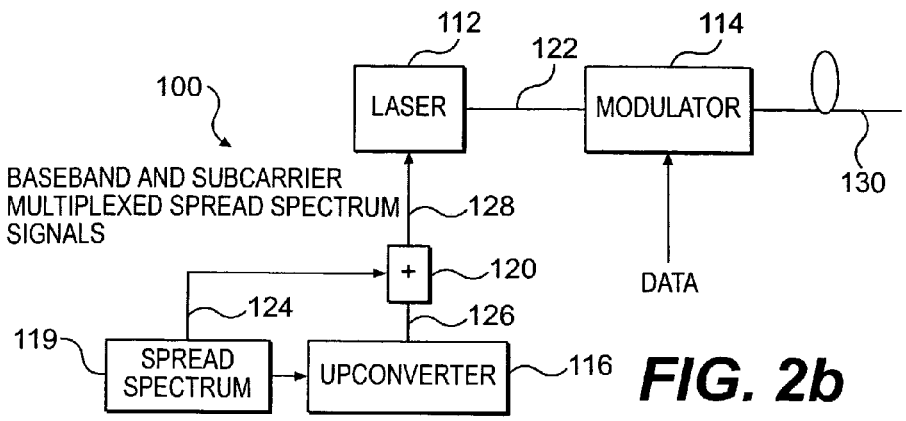
FIG. 2b is a schematic illustration of an embodiment of the invention that provides direct baseband and subcarrier modulation of an optical carrier by spread spectrum signals.
Figure 2C:
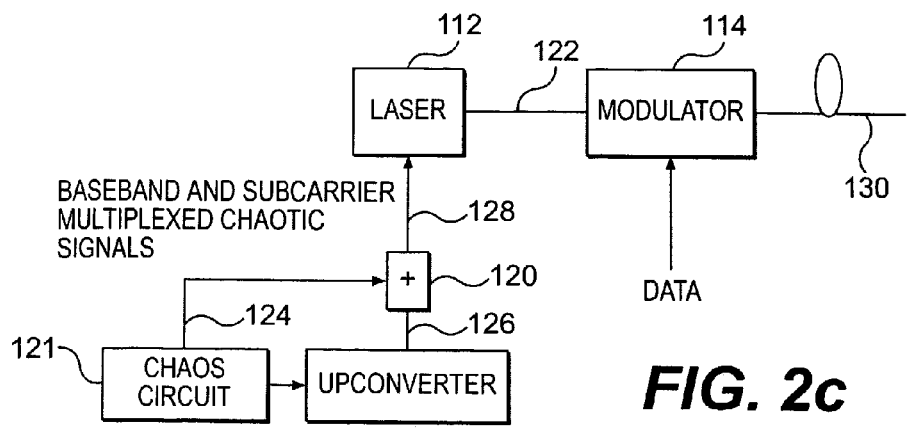
FIG. 2c is a schematic illustration of an embodiment of the invention that provides direct baseband and subcarrier modulation of an optical carrier by chaotic signals.

FIGS. 2a, 2b and 2c show schematic representations of optical transmitters which substantially increase Brillouin threshold and thus allow propagation of optical signals over long distances using data efficient formats, such as but not limited to quadrature amplitude modulated (QAM) data and video signals. In this embodiment, the optical transmitter 100 includes a coherent laser source 112, an external modulator 114, an upconverter 116, a pseudo-random signal (PRS) generator 118, and an adding device 120. Coherent laser source 112 is connected to external modulator 114 via optical fiber 122. The coherent laser source 112 is directly modulated with baseband complex signals or waveforms.

In all of these cases the increased Brillion threshold is possible because of the increased optical field modulation causing wavelength chirp. This causes a shift in the Brillion acoustic wavelength, thus overcoming the Brillion threshold launch limitations. The rate of chaotic, spread spectrum, etc optical field modulation can additionally allow lower peak amplitude values required for sufficient Stimulated Brillion Suppression.

A direct modulation of a coherent laser source can be achieved, for example, by the use of an electro-optical modulator that applies a voltage across a birefringent crystal, such as in a pockels cell, to vary differentially the refractive index along various crystal axes. The operational mode of the electro-optical modulator is voltage dependent and generally consists of polarization by 90 deg. A light beam incident upon the three-dimensional pattern of refractive indices is variably diffracted to create losses in the laser cavity and modulation in intensity of the emitted beam. Examples of an external modulator 114 that can be used in transmitter 100 include a Mach-Zehnder modulator.

The modulation of the complex waveforms used in the modulation of the optical radiation generated by coherent laser source 112 is performed in the electrical domain. This includes modulation by pseudo-random electrical signals, spread-spectrum electrical signals, or chaotic electrical signals, as well as baseband and subcarrier modulation.

In an embodiment, the complex waveforms are directly modulated, e.g., amplitude modulated, by pseudo-random signals sent through line 124 to adding device 120 to be added to the upconverter signal sent through line 126 as shown in FIG. 2a. The pseudo-random signals are generated by PRS generator 118. One may also employ stored complex signals, or receive them from external sources without departing from the scope of the invention. The complex waveforms which are baseband and/or sub-carrier multiplexed complex waveforms modulate the coherent laser source 112 through a direct modulator via line 128.

In another embodiment, the complex waveforms are directly modulated, e.g., amplitude modulated, by spread spectrum signals sent through line 124 to adding device 120 to be added to upconverter signal sent through line 126 as shown in FIG. 2b. The spread spectrum signals are generated by spread spectrum generator 119. The complex waveforms which are baseband and/or sub-carrier multiplexed spread spectrum waveforms modulate the coherent laser source 112 through a direct modulator via line 128.

In another embodiment, the complex waveforms are directly modulated, e.g., amplitude modulated by chaotic signals sent through line 124 to adding device 120 to be added to upconverter signal sent through line 126 as shown in FIG. 2c. The spread spectrum signals are generated by chaotic signals generator 121. The complex waveforms which are baseband and/or sub-carrier multiplexed chaotic waveforms modulate the coherent laser source 112 through a direct modulator via line 128.

The coherent laser source 112 emits a modulated optical signal, modulated with the complex waveform which may be, for example, random waveforms, spread spectrum waveforms or chaotic waveforms. The optical signal, modulated with the complex signals, which are non-information signals, then is transmitted through optical fiber 122 to external modulator 114 where data to be transmitted is imposed on the modulated optical signal and launched into transmission optical fiber 130. At this stage, optical amplification may or may not be performed prior to launching into the transmission line 130.

Figure 3:
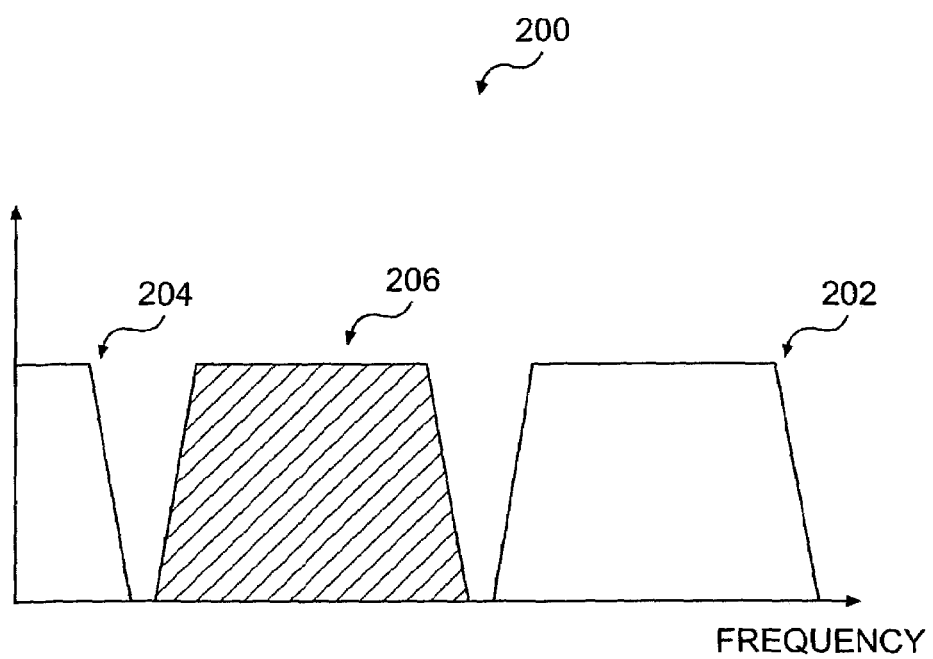
FIG. 3 is schematic illustration of an exemplary spectrum of the optical transmitter output showing the various signal frequency bands (baseband complex signals, data signals and subcarrier multiplexed complex signals)

The signal spectrum 200 at the launch point is shown in FIG. 3. As shown in FIG. 3, the subcarrier multiplexed complex waveform signals 202 and baseband signals 204 are outside the band of the data signals 206. At the receiver, the data is appropriately filtered, either optically or after conversion into the electrical domain to recover the data signals 206. The fact that the subcarrier multiplexed signals 202 and baseband signals 204 are outside the band of the data signals 206 results in a broadening of the combined signal in the frequency domain. This is one factor that leads to an increase in the Brilloum Threshold. Therefore, higher optical power can be propagated in the optical fiber without penalties from the optical fiber nonlinearities such as optical stimulated Brillouin scattering due to a non-linear behavior of the optical fiber material at high laser power.

Figure 4A:
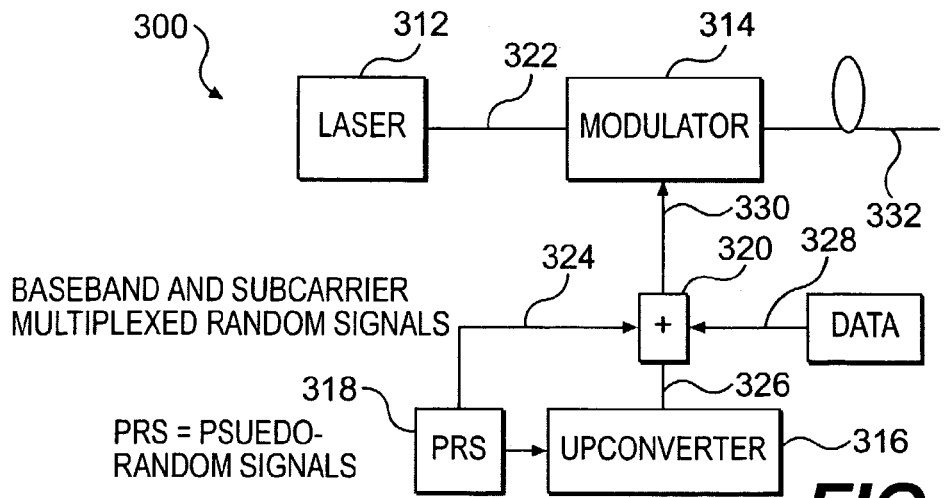
FIG. 4a is a schematic illustration of an embodiment of the invention that provides external modulation of an optical carrier with baseband and subcarrier multiplexed pseudo-random signals.
Figure 4B:
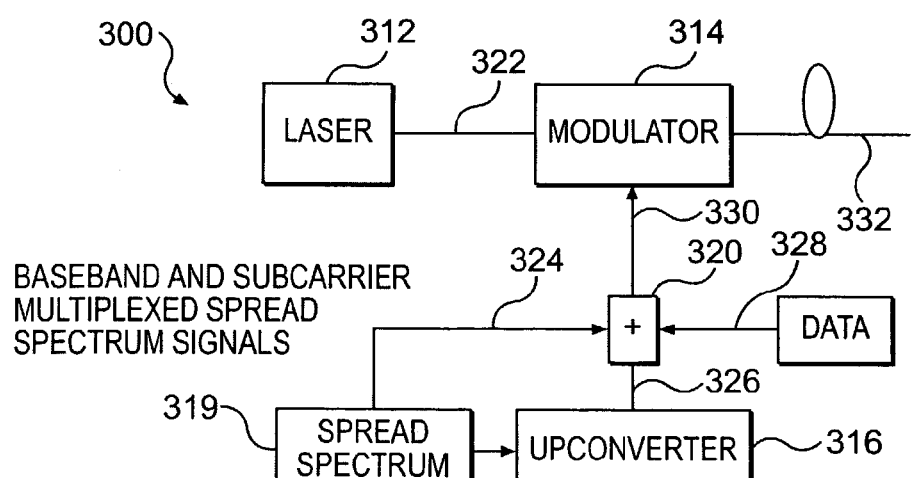
FIG. 4b is a schematic illustration of an embodiment of the invention that provides external modulation of an optical carrier with baseband and subcarrier multiplexed spread spectrum signals.
Figure 4C:
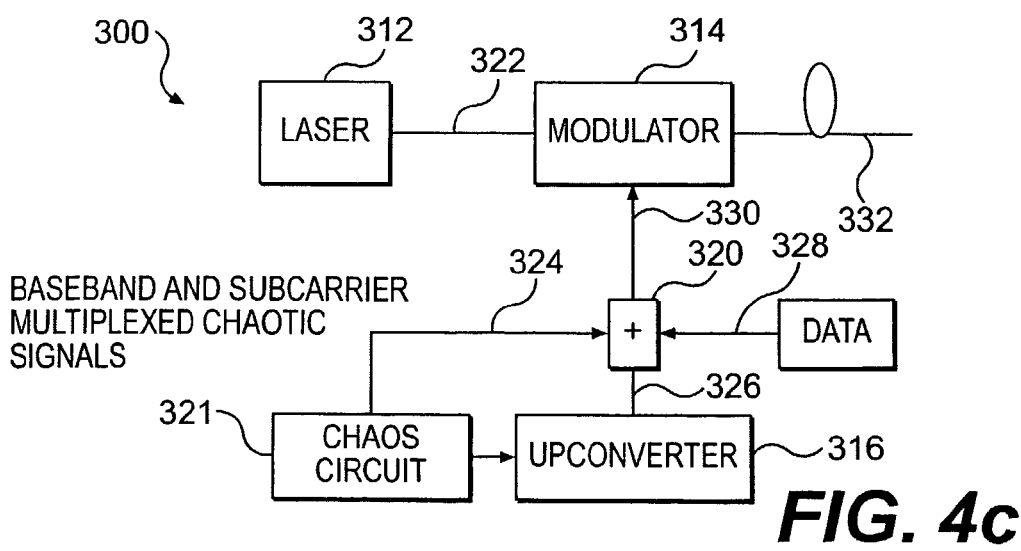
FIG. 4c is a schematic illustration of an embodiment of the invention that provides external modulation of an optical carrier with baseband and subcarrier multiplexed chaotic signals.

In another embodiment, all the signals including the subcarrier multiplexed complex signals as well as the baseband complex waveforms and the data signals (information signals) are imposed onto an optical carrier using a single external modulator 314 as shown in FIGS. 4a, 4b and 4c. FIGS. 4a, 4b and 4c show the optical communication system 300 including a coherent laser source 312, a modulator 314, an upconverter 316, an adding device 320. Coherent laser source 312 is connected to modulator 314 via optical fiber 322.

In an embodiment, the complex waveforms may be amplitude modulated by pseudo-random signals sent through line 324 to adding device 320 to be added to upconverter signal sent through line 326 and to be added to data signal transmitted through line 328 as shown in FIG. 4a. The pseudo-random signals are generated by PRS generator 318. The sum of the signals including the baseband and subcarrier multiplexed pseudo-random signals and the data signals are in communication with the modulator 314 via line 330.

In another embodiment, the complex waveforms are modulated, e.g. amplitude modulated, by spread spectrum signals sent through line 324 to adding device 320 to be added to upconverter signal sent through line 326 and to be added to data signal transmitted through line 328 as shown in FIG. 4b. The spread spectrum signals are generated by spread spectrum generator 319. The sum of the signals including the baseband and subcarrier multiplexed spread spectrum signals and the data signals are in communication with the modulator 314 via line 330.

In another embodiment, the complex waveforms are modulated, e.g., amplitude modulated, by chaotic signals sent through line 324 to adding device 320 to be added to upconverter signal sent through line 326 and to be added to data signal transmitted through line 328 as shown in FIG. 4b. The chaotic signals are generated by chaos circuit generator 321. The sum of the signals including the baseband and subcarrier multiplexed chaotic signals and the data signals are in communication with the modulator 314 via line 330.

The optical coherent laser radiation is then modulated by the superposition of a complex multiplexed signal including the data signal to form a modulated optical signal. The modulated optical signal is then launched in the optical fiber transmission line 332. Similarly to the embodiments illustrated in FIGS. 2a, 2b and 2c, an optical amplification may or may not be performed prior to launching into the transmission line 332.

Figure 5A:
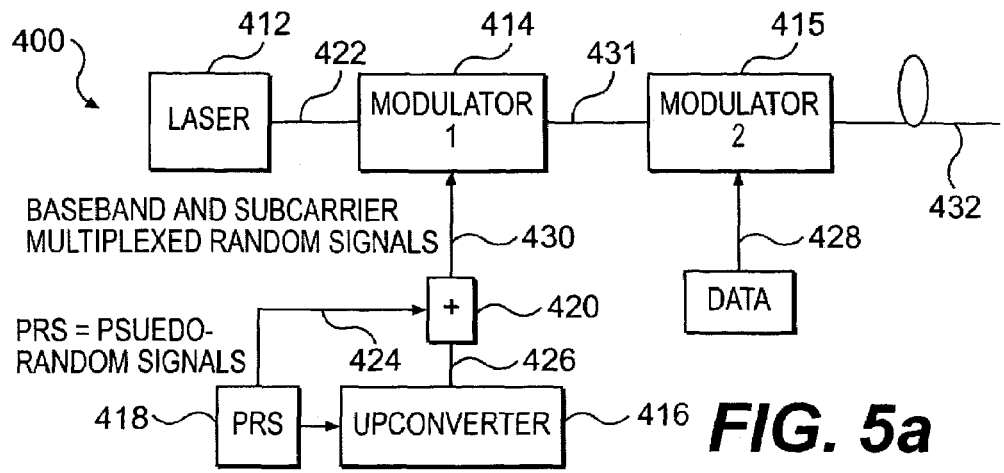
FIG. 5a is a schematic illustration of an embodiment of the invention that provides external modulation of an optical carrier with baseband and subcarrier multiplexed pseudo-random signals and imposing the data on the optical carrier by using a second modulator.
Figure 5B:
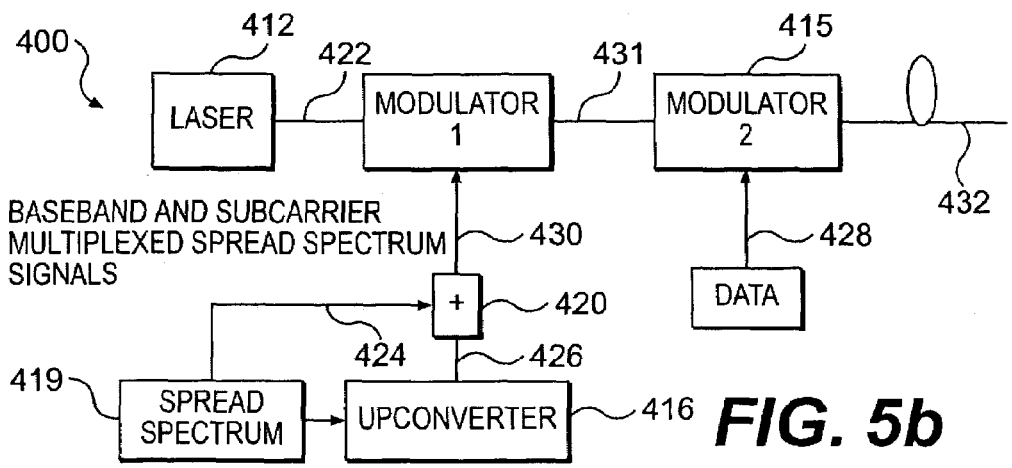
FIG. 5b is a schematic illustration of an embodiment of the invention that provides external modulation of an optical carrier with baseband and subcarrier multiplexed spread spectrum signals and imposing the data on the optical carrier by using a second modulator.
Figure 5C:
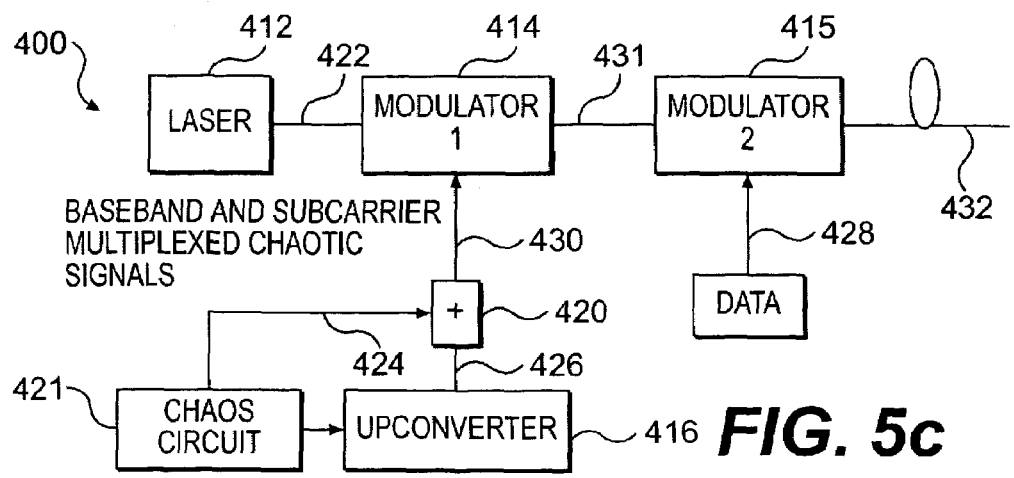
FIG. 5c is a schematic illustration of an embodiment of the invention that provides external modulation of an optical carrier with baseband and subcarrier multiplexed chaotic signals and imposing the data on the optical carrier by using a second modulator.

In another embodiment, the modulation is accomplished by using two modulators as shown in FIGS. 5a, 5b and 5c. The multiplexed complex signals as well as the baseband complex waveforms and the actual data signals are imposed using two external modulators 414 and 415. FIGS. 5a, 5b and 5c show the optical communication system 400 including a coherent laser source 412, a modulator 414, an upconverter 416, an adding device 420. Coherent laser source 412 is connected to modulator 414 via transmission line 422. Modulator 414 is connected to modulator 415 via transmission line 431.

In an embodiment, the complex waveforms are modulated, e.g., amplitude modulated, by pseudo-random signals sent through line 424 to adding device 420 to be added to upconverter signal sent through line 426 as shown in FIG. 5a. The pseudo-random signals are generated by PRS generator 418. The baseband and subcarrier multiplexed pseudo-random signals are in communication with the modulator 414 via line 430.

In another embodiment, the complex waveforms are modulated, e.g., amplitude modulated, by spread spectrum signals sent through line 424 to adding device 420 to be added to upconverter signal sent through line 426 as shown in FIG. 5b. The spread spectrum signals are generated by spread spectrum generator 419. The baseband and subcarrier multiplexed spread spectrum signals are in communication with the modulator 414 via line 430.

In another embodiment, the complex waveforms are modulated, e.g. amplitude modulated, by chaos signals sent through line 424 to adding device 420 to be added to upconverter signal sent through line 426 as shown in FIG. 5c. The chaos signals are generated by chaos circuit generator 421. The baseband and subcarrier multiplexed chaos signals are in communication with the modulator 414 via line 430.

The coherent laser source 412 emits coherent radiation that is transmitted trough optical fiber 422 to be modulated by a multiplexed complex signal in modulator 414. The modulated optical signal is then transmitted through optical fiber 431 to second modulator 415 where data transmitted through transmission line 428 is imposed on the modulated optical signal and launched into transmission optical fiber 432. At this stage, optical amplification may or may not be performed prior to launching into the transmission line 432.

Figure 6A:
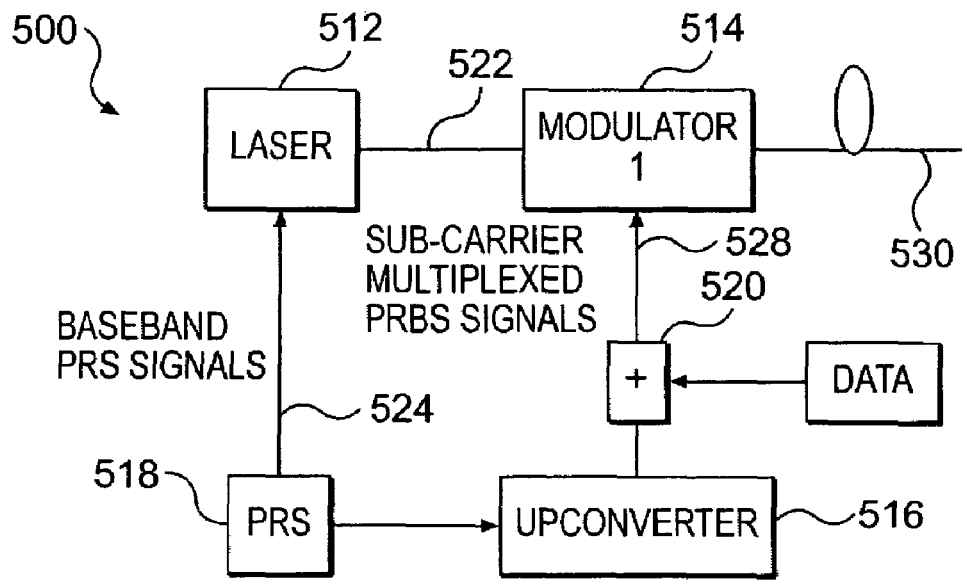
FIG. 6a is a schematic illustration of an embodiment of the invention that provides a combination of direct and external modulation of an optical carrier with baseband, subcarrier multiplexed pseudo-random signals and modulating data signals on the optical carrier with an external modulator.
Figure 6B:
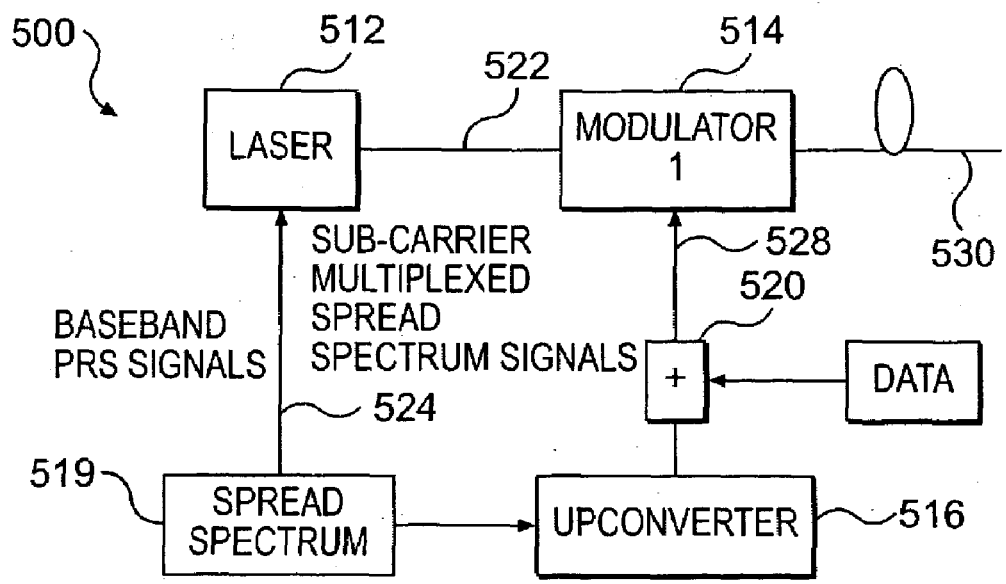
FIG. 6b is a schematic illustration of an embodiment of the invention that provides a combination of direct and external modulation of an optical carrier with baseband, subcarrier multiplexed spread spectrum signals and modulating data signals on the optical carrier with an external modulator.

In another embodiment, the laser is modulated with baseband complex waveforms while using an external modulator to impose the subcarrier frequency signals containing complex waveforms as shown in FIGS. 6a and 6b. FIGS. 6a and 6b show the optical communication system 500 including a coherent laser source 512, a modulator 514, an upconverter 516, and an adding device 520. Coherent laser source 512 is connected to modulator 514 via transmission line 522.

In an embodiment, the coherent laser source may be directly modulated by pseudo-random (PRS) baseband signals sent through line 524 as shown in FIG. 6a. The pseudo-random signals are generated by PRS generator 518. Subcarrier multiplexed pseudo-random signals are sent via upconverter 516 to adding device 520 where data signals are added. The subcarrier multiplexed pseudo-random signals and the data signals are then transmitted to modulator 514 via transmission line 528 in order to modulate coherent laser radiation received by modulator 514 through optical fiber 522. The modulated optical signal is then transmitted through optical fiber 530. At this stage, optical amplification may or may not be performed prior to launching into the transmission line 530.

In another embodiment, the coherent laser source may be directly modulated by spread spectrum baseband signals sent through line 524 as shown in FIG. 6b. The spread spectrum signals are generated by spread spectrum generator 519. Subcarrier multiplexed pseudo-random signals are sent via upconverter 516 to adding device 520 where data signals are added. The subcarrier multiplexed pseudo-random signals and the data signals are then transmitted to modulator 514 via transmission line 528 in order to modulate coherent laser radiation received by modulator 514 through optical fiber 522. The modulated optical signal is then transmitted through optical fiber 530. At this stage, optical amplification may or may not be performed prior to launching into the transmission line 530.

Figure 7:
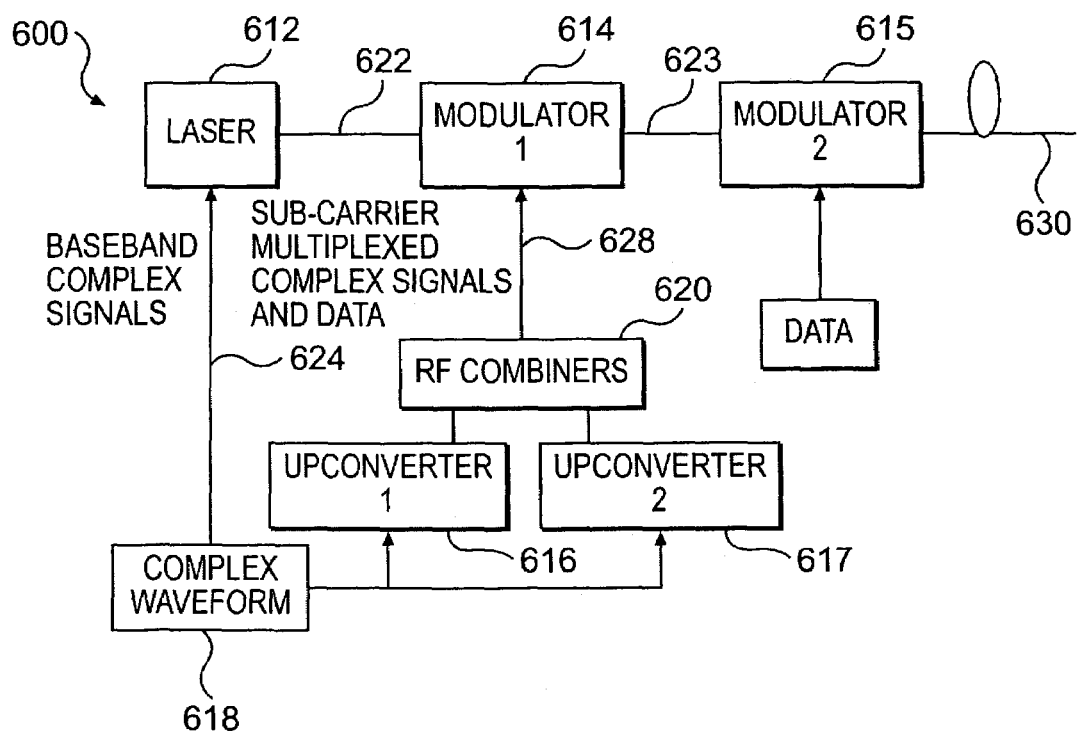
FIG. 7 is a schematic illustration of an embodiment of the invention that provides a combination of direct and external modulation of an optical carrier using multiple subcarrier frequencies.

In another embodiment, multiple subcarrier signals having different frequencies may be used, the subcarrier signal containing the complex waveforms as shown in FIG. 7. The communication system 600 includes a coherent laser source 612, external modulators 614 and 615, upconverters 616 and 617, RF combiners 620. Coherent laser source 612 is connected to modulator 614 via optical fiber 622 which in turn is connected to modulator 615 via transmission line 623.

In this embodiment, the coherent laser source may be directly modulated by complex waveform signals sent through line 624. The complex waveform signals are generated by complex waveforms generator 618. Two subcarrier multiplexed complex signals are modulated via upconverters 616 and 617. Although FIG. 7 illustrates the use of two upconverters to form two modulated subcarrier signals, one of ordinary skill in the art would understand that the generation of more than two subcarrier signal is possible by providing more than two upconverters. In this embodiment, the use of multiple upconverters to form multiple upconverted complex signals provides more flexibility.

The two subcarrier signals are transmitted to RF-combiners 620 and combined to form one subcarrier multiplexed complex signal to be transmitted through line 628 to modulator 614 (such as a phase modulator) in order to modulate coherent laser radiation received by modulator 614 (such as an amplitude modulator) through optical fiber 622. The modulated optical carrier is then transmitted through optical fiber 623 to modulator 615 and data is put on the optical modulated optical carrier through the modulator 615. The resulting optical signal containing the optical carrier as well as the data is sent through optical fiber 630. At this stage, optical amplification may or may not be performed prior to launching into the transmission line 630.

The use of complex modulation such as complex subcarrier and complex baseband modulation allows effectively broadening of the line-width of the coherent laser source. Therefore, this broadening in frequency of the optical signal increases the Brilloum Threshold thus allowing the propagation of higher power optical signals in the optical fiber without penalties from the optical fiber nonlinearities such as optical stimulated Brilloum scattering. The non-linear effects due to the interaction of light with the vibrational acoustic modes in the optical fiber material manifest themselves as a build-up of a grating-like structure in the core material of the optical fiber thus promoting Brilloum backscattering. Moreover, the complex waveform in the modulated signal promotes frequency hopping around the subcarrier as well as near the optical carrier frequency. This frequency hopping promotes an increased Brillouin Threshold.

The combination of increased linewidth or broadening and "randomized" frequency hopping allows higher optical powers to propagate in optical fibers without non-linear impairment such as stimulated Brillouin scattering, hence facilitating transport of bandwidth efficient optical formats through optical transmission lines over long distances.

Figure 8:
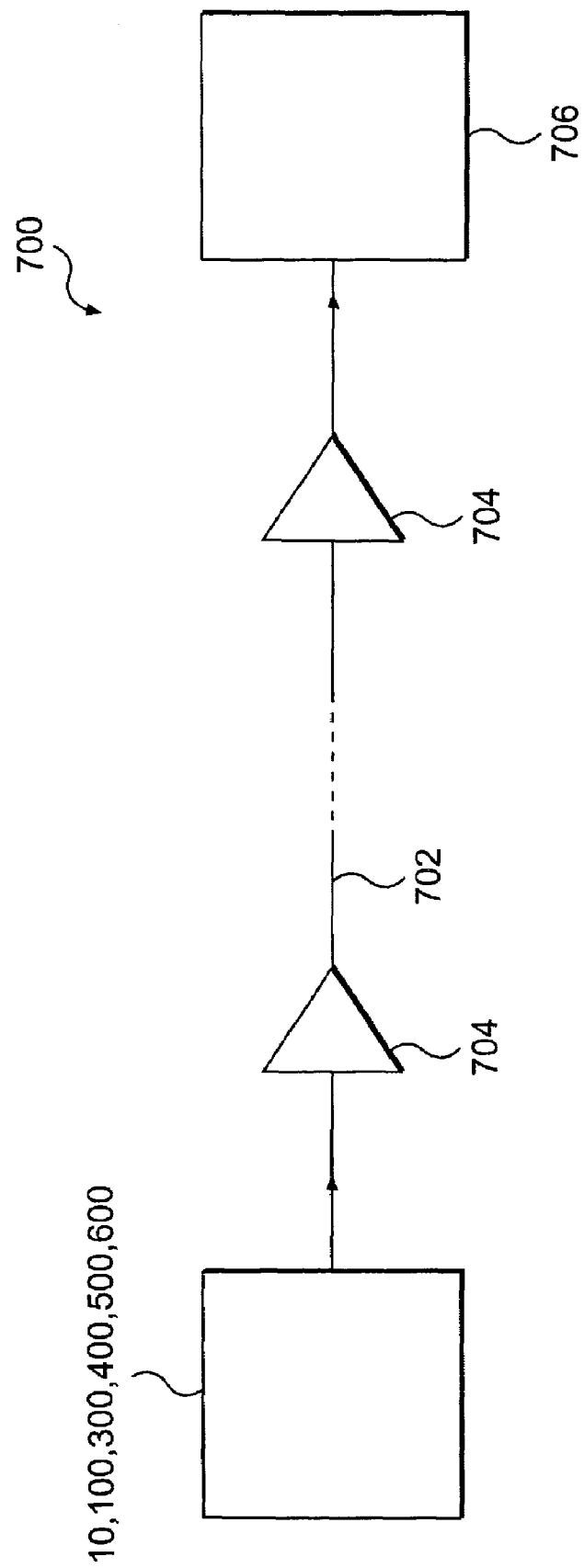
FIG. 8 shows an optical communication system using an optical transmitter according to an embodiment of the present invention.

Another aspect of the present invention is to provide, an optical communication system. In one embodiment, as shown in FIG. 8, the optical communication system 700 includes a transmitter 10, 100, 300, 400, 500, and 600 according to any one of the embodiments previously described, an optical transmission line 702, and a receiver 706. An amplifier or a series of amplifiers 704 may be included in the transmission line 702 in order to amplify the optical signal transmitted therethrough.

Figure 9:
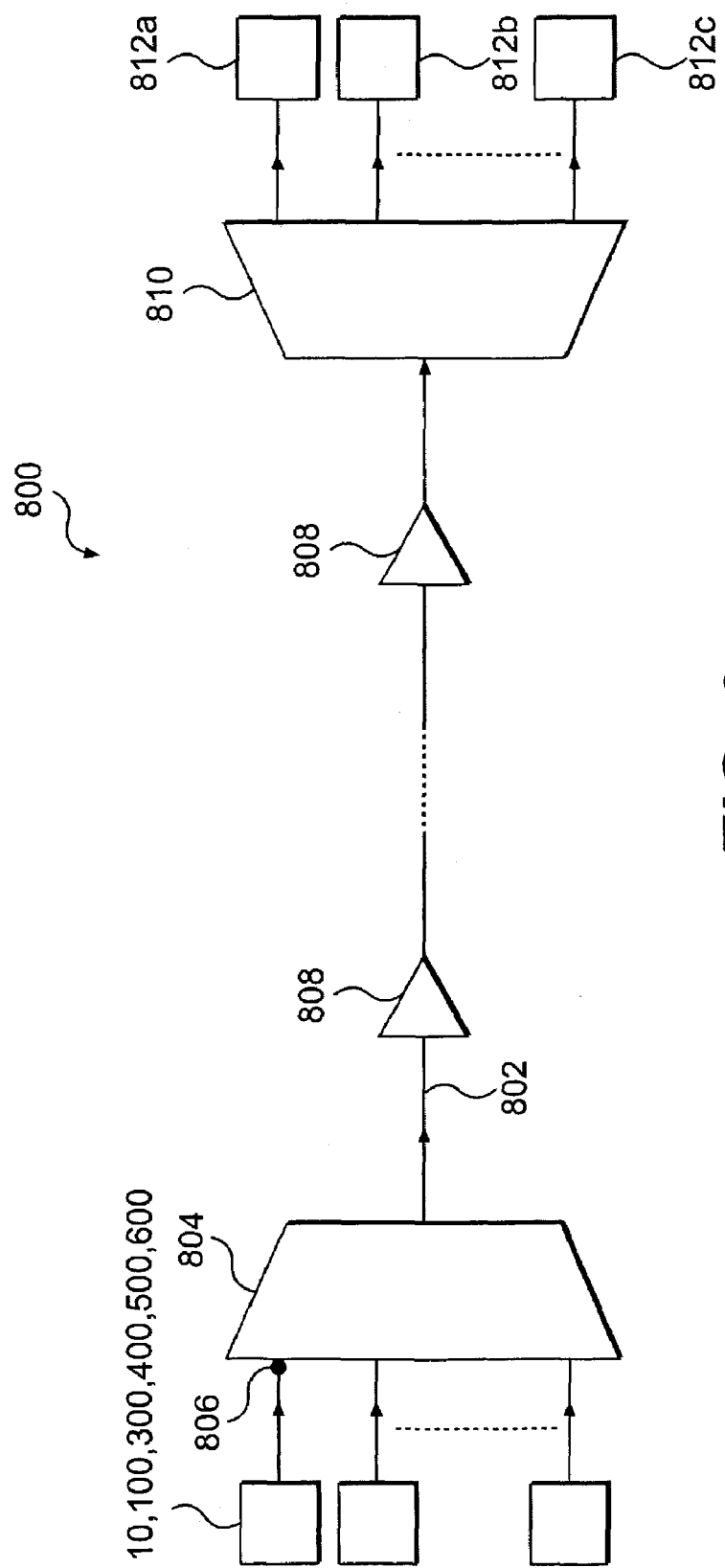
FIG. 9 shows an optical communication system using an optical transmitter according to another embodiment of the present invention.

In another embodiment, as shown in FIG. 9, the optical communication system 800 includes an optical transmission line 802, a wavelength division multiplexer 804 connected to the optical transmission line 802, and a transmitter 10, 100, 300, 400, 500, and 600 according to any one of the embodiments described previously. The transmitter 10, 100, 300, 400, 500, and 600 is connected to an input port 806 of the wavelength division multiplexer 804. The optical transmission line may comprise optical amplifier 808 to amplify the optical signal transmitted through optical transmission line 802. The optical signal is demultiplexed with wavelength division demultiplexer 810 and transmitted to various receivers 812a, 812b . . . and 812i (i representing the i th receiver). Optical amplifier 808 can be a lumped optical amplifier or a distributed amplifier. A lumped optical amplifier may be selected from, for example, conventional erbium-doped fiber amplifiers (EDFA). Suitable distributed amplifiers include Raman amplifiers or erbium doped along a portion of the transmission line itself (optical fiber) 802.

Though the transmission system has been described in connection to its application in communication networks and systems operating in the 1550 nm low loss transmission window of the optical fiber, the transmission system technique may also be applicable to a wide range of wavelengths.

While the invention has been described in connection with particular embodiments, it is to be understood that the invention is not limited to only the embodiments described, but on the contrary it is intended to cover all modifications and arrangements included within the spirit and scope of the invention as defined by the claims, which follow.

We claim:

1. A transmitter for optical communication systems, comprising:
  a source of optical radiation;
  a source of complex non-information signals;
  a modulator unit in communication with said source of optical radiation, in communication with said source of complex non-information signals, and further having an input adapted to receive information-bearing signals;
  wherein an output spectrum of said transmitter comprises
    baseband signals having a spectral distribution on a low end of said spectrum,
    upconverted complex non-information signals having a spectral distribution on a high end of the spectrum, and
    information bearing signals having a spectral distribution in a middle of said spectrum.

2. A transmitter for optical communication systems according to claim 1, wherein
  said information-bearing signals have a first spectral distribution, and said source of complex non-information signals provides a complex non-information signal having a second spectral distribution that is substantially non-overlapping with said first spectral distribution.

3. A transmitter for optical communication systems according to claim 1, wherein said source of complex non-information signals is a pseudo-random signal generator.

4. A transmitter for optical communication systems according to claim 1, wherein said source of complex non-information signals is a spread spectrum signal generator.

5. A transmitter for optical communication systems according to claim 1, wherein said source of complex non-information signals is a chaotic signal generator.

6. A transmitter for optical communication systems according to claim 1, wherein said modulator unit comprises a direct modulator and an external modulator.

7. A transmitter for optical communication systems according to claim 6, wherein said external modulator is in communication with said input adapted to receive information-bearing signals.

8. A transmitter for optical communication systems according to claim 7, wherein said source of complex non-information signals is in communication with said direct modulator.

9. A transmitter for optical communication systems according to claim 8, wherein said modulator unit further comprises an upconverter in communication with said source of complex non-information signals and in communication with said direct modulator.

10. A transmitter for optical communication systems according to claim 8, wherein said modulator unit further comprises an upconverter in communication with said source of complex non-information signals and in communication with said external modulator.

11. A transmitter for optical communication systems according to claim 6, wherein said external modulator is a Mach-Zehnder interferometer.

12. A transmitter for optical communication systems according to claim 1, wherein said modulator unit comprises an external modulator in communication with at least one of said source of complex non-information signals and said input adapted to receive information-bearing signals.

13. A transmitter for optical communication systems according to claim 12, wherein said modulator unit comprises an external modulator in communication with said source of complex non-information signals and in communication with said input adapted to receive information-bearing signals.

14. A transmitter for optical communication systems according to claim 13, wherein said modulator unit further comprises an upconverter in communication with said complex non-information signals and in communication with said external modulator.

15. A transmitter for optical communication systems according to claim 13, wherein said modulator unit further comprises an upconverter in communication with said complex non-information signals and said external modulator.

16. A transmitter for optical communication systems according to claim 12, wherein external modulator is in communication with said source of complex non-information signals.

17. A transmitter for optical communication systems according to claim 16, wherein a modulator unit further comprises an upconverter in communication with said complex non-information signals and said modulator.

18. A transmitter for optical communication systems according to claim 17, wherein said modulator unit further comprises a second modulator in communication with said input adapted to receive information-bearing signals.

19. A transmitter for optical communication systems according to claim 18, wherein said modulator further comprises a direct modulator in communication with said complex non-information signals.

20. A transmitter for optical communication systems according to claim 19, wherein said modulator unit further comprises a second upconverter in communication with said complex non-information signals and in communication with the first mentioned modulator.

21. A transmitter for optical communication systems according to claim 1, wherein said source of optical radiation is a laser.

22. An optical communication system comprising:
an optical transmission line;
a transmitter in communication with said optical transmission line; and
a receiver in communication with the optical transmission line,
wherein the transmitter comprises:
a source of optical radiation;
a source of complex non-information signals; and
a modulator unit in communication with said source of optical radiation, in communication with said source of complex non-information signals, and further having an input adapted to receive information-bearing signals, wherein an output spectrum of said transmitter comprises
baseband signals having a spectral distribution on a low end of said spectrum,
upconverted complex non-information signals having a spectral distribution on a high end of the spectrum, and
information bearing signals having a spectral distribution in a middle of said spectrum.

23. An optical communication system according to claim 22 further compnsing:
a wavelength division multiplexer in communication with said transmission line and in communication with said transmitter; and
a wavelength division demultiplexer in communication with said transmission line and in communication with said receiver.

24. An optical communication system according to claim 22, wherein
said information-bearing signals have a first spectral distribution, and
said source of complex non-information signals provides a complex non-information signal having a second spectral distribution that is substantially non-overlapping with said first spectral distribution.

25. An optical communication system according to claim 22, wherein said source of complex non-information signals is a pseudo-random signal generator.

26. An optical communication system according to claim 22, wherein said source of complex non-information signals is a spread spectrum signal generator.

27. An optical communication system according to claim 22, wherein said source of complex non-information signals is a chaotic signal generator.

28. An optical communication system according to claim 22, wherein said source of optical radiation is a laser.

29. An optical communication system according to claim 22, wherein said modulator unit comprises a direct modulator and an external modulator.

30. An optical communication system according to claim 29, wherein said external modulator is a Mach-Zehnder interferometer.

31. An optical communication system according to claim 29, wherein said external modulator is in communication with said input adapted to receive information-bearing signals.

32. An optical communication system according to claim 31, wherein said source of complex non-information signals is in communication with said direct modulator.

33. An optical communication system according to claim 32, wherein said modulator unit further comprises an upconverter in communication with said source of complex non-information signals and in communication with said direct modulator.

34. An optical communication system according to claim 32, wherein said modulator unit further comprises an upconverter in communication with said source of complex non-information signals and in communication with said external modulator.

35. An optical communication system according to claim 22, wherein said modulator unit comprises an external modulator in communication with at least one of said source of complex non-information signals and in communication with said input adapted to receive information-bearing signals.

36. An optical communication system according to claim 35, wherein said modulator unit comprises an external modulator in communication with said source of complex non-information signals and in communication with said input adapted to receive information-bearing signals.

37. An optical communication system according to claim 36, wherein said modulator unit further comprises an upconverter in communication with said complex non-information signals and in communication with said external modulator.

38. An optical communication system according to claim 36, wherein said modulator unit further comprises an upconverter in communication with said complex non-information signals and in communication with said external modulator.

39. An optical communication system according to claim 35, wherein external modulator is in communication with said source of complex non-information signals.

40. An optical communication system according to claim 35, wherein said modulator unit further comprises an upconverter in communication with said complex non-information signals and in communication with said modulator.

41. An optical communication system according to claim 40, wherein said modulator unit further comprises a second modulator in communication with said input adapted to receive information-bearing signals.

42. An optical communication system according to claim 41, wherein said modulator further comprises a direct modulator in communication with said complex non-information signals.

43. An optical communication system according to claim 42, wherein said modulator unit further comprises a second upconverter in communication with said complex non-information signals and in communication with the first mentioned modulator.

44. A method of transmitting information in an optical communication system, comprising:
generating a beam of light;
modulating said beam of light responsive to a complex non-information signal; and
modulating said beam of light responsive to an information signal, wherein
said complex non-information signal has a first signal spectrum and said information signal has a second signal spectrum, said first and second signal spectra being substantially non-overlapping in a frequency domain; and
an output spectrum of said transmitted information comprises
baseband signals having a spectral distribution on a low end of said spectrum,
upconverted complex non-information signals having a spectral distribution on a high end of the spectrum, and
information bearing signals having a spectral distribution in a middle of said spectrum.

45. A method of transmitting information in an optical communication system according to claim 44, wherein said complex non-information signal comprises a pseudo-random signal.

46. A method of transmitting information in an optical communication system according to claim 44, wherein said complex non-information signal comprises a spread spectrum signal.

47. A method of transmitting information in an optical communication system according to claim 44, wherein said complex non-information signal comprises a chaotic signal.

48. A method of transmitting information in an optical communication system according to claim 44, wherein said modulating said beam of light responsive to complex non-information signal comprises upconverting said complex non-information signal.

49. A method of transmitting information in an optical communication system according to claim 44, wherein said modulating said beam of light responsive to complex non-information signal is direct modulation.

50. A method of transmitting information in an optical communication system according to claim 44, wherein said modulating said beam of light responsive to complex non-information signal is external modulation.

* * * * *